US008302282B2

(12) United States Patent
Wille

(10) Patent No.: US 8,302,282 B2
(45) Date of Patent: Nov. 6, 2012

(54) SYSTEM AND/OR ASSEMBLY FOR INSTALLING FASTENING DEVICES AND METHOD OF INSTALLING FASTENING DEVICES USING THE SYSTEM OR ASSEMBLY

(75) Inventor: Lothar Wille, Moerfelden-Walldorf (DE)

(73) Assignee: Gesipa Blindniettechnik GmbH, Frankfurt a.M. (DE)

( * ) Notice: Subject to any disclaimer, the term of this patent is extended or adjusted under 35 U.S.C. 154(b) by 1292 days.

(21) Appl. No.: 12/035,943

(22) Filed: Feb. 22, 2008

(65) Prior Publication Data

US 2008/0201933 A1 Aug. 28, 2008

(30) Foreign Application Priority Data

Feb. 26, 2007 (DE) ........................ 10 2007 009 618

(51) Int. Cl.
*B23Q 3/00* (2006.01)
*B25B 27/00* (2006.01)

(52) U.S. Cl. ................ 29/464; 29/428; 227/119; 81/54; 81/57.33

(58) Field of Classification Search .................... 81/434, 81/57.37, 57.33, 54; 227/119; 29/464, 428
See application file for complete search history.

(56) References Cited

U.S. PATENT DOCUMENTS

| | | | | |
|---|---|---|---|---|
| 7,493,839 | B2 * | 2/2009 | Massari et al. | 81/434 |
| 7,494,310 | B1 | 2/2009 | Bodin et al. | |
| 7,992,469 | B2 * | 8/2011 | Chang et al. | 81/57.37 |
| 7,997,171 | B2 * | 8/2011 | Massari et al. | 81/434 |
| 2003/0190211 | A1 | 10/2003 | Bodin | |
| 2005/0163585 | A1 | 7/2005 | Bodin et al. | |
| 2006/0191385 | A1 * | 8/2006 | Massari et al. | 81/434 |
| 2008/0206011 | A1 * | 8/2008 | Wille | 411/34 |
| 2008/0223185 | A1 * | 9/2008 | Massari et al. | 81/434 |

FOREIGN PATENT DOCUMENTS

| | | |
|---|---|---|
| DE | 34 38 219 | 7/1985 |
| DE | 102 53 888 | 7/2005 |
| EP | 1 350 965 | 8/2003 |
| FR | 2 613 266 | 4/1987 |
| FR | 2 668 413 | 4/1992 |
| GB | 2 130 949 | 6/1984 |

OTHER PUBLICATIONS

U.S. Appl. No. 12/035,937, filed Feb. 22, 2008.

* cited by examiner

*Primary Examiner* — Derris Banks
*Assistant Examiner* — Kaying Kue
(74) *Attorney, Agent, or Firm* — Greenblum & Bernstein, P.L.C.

(57) ABSTRACT

Placing device for placing a fastener. The device includes a housing, a mounting surface for a fastener and comprising an opening, a drive mandrel comprising a rotation axis and a portion which passes through the opening and that is structured and arranged to engage the fastener, and a fork-shaped receptacle arranged at least one of in an area of the mounting surface, adjacent the mounting surface, and associated with the mounting surface.

17 Claims, 3 Drawing Sheets

SYSTEM AND/OR ASSEMBLY FOR INSTALLING FASTENING DEVICES AND METHOD OF INSTALLING FASTENING DEVICES USING THE SYSTEM OR ASSEMBLY

CROSS-REFERENCE TO RELATED APPLICATIONS

The present application claims priority under 35 U.S.C. §119 of German Patent Application No. 10 2007 009 618.8, filed on Feb. 26, 2007, the disclosure of which is expressly incorporated by reference herein in its entirety.

BACKGROUND OF THE INVENTION

1. Field of the Invention

The invention relates to a system or assembly for installing a fastening unit such as a fastener. The assembly utilizes a housing, a drive mandrel and a mounting surface. The drive mandrel has a rotational axis and can be brought into engagement with the fastening unit or fastener through an opening in the mounting surface.

2. Discussion of Background Information

An assembly or placing device of this type can be used, for example, for installing or placing a fastening unit of the type disclosed in DE 102 53 888 B4, the disclosure of which is expressly incorporated by reference herein in its entirety. The fastening unit utilizes a blind rivet nut and a screw. The blind rivet nut has a rivet shank with an internal thread and a set head. Such a fastener can be used to fasten components to thin-walled workpieces, such as, e.g., metal sheets.

The fastening unit is installed by guided it first through the component to be fastened (e.g., via a opening in the component) and subsequently through a bore in the metal sheet. While the set head of the blind rivet nut is held in contact with the metal sheet, an axial tensile force is exerted on the rivet shank of the blind rivet nut via the screw. This leads to the formation of a closing head on the other side of the metal sheet, so that the blind rivet nut is attached in the metal sheet in the manner of a blind rivet. In order to prevent the blind rivet nut from being rotated with the screw during the installing or placing process, the blind rivet nut generally has a polygonal cross section in an area of the rivet shank (the opening in the workpiece being similarly embodied), so that torque introduced through the screw is absorbed by the workpiece.

The component to be fastened typically is already provisionally attached to the workpiece or metal sheet before the placement of the fastening unit or fastener. This provisional fastening is thus carried out, e.g., by way of plastic clips. The fastening unit or fastener must then be inserted through the component to be fastened and subsequently guided through the workpiece. However, it is often necessary to slightly move or rotate the component to be fastened in order to be able to guide the fastening unit through the opening in the workpiece. This occurs, in particular, when the rivet shank of the fastening unit has a polygonal cross section that must be brought into alignment with the corresponding shaped opening in the workpiece.

In order to provide for a quick and reliable placement of the fastening unit, it is thereby desirable to guide the fastening unit or fastener into the workpiece.

SUMMARY OF THE INVENTION

The invention provides for an installation assembly, an installation device, an installation arrangement, and/or a placing device with which a fastening unit or fastener can be guided through the component to be fastened and through the workpiece.

The installation assembly or arrangement can preferably utilize a fork-shaped receptacle that is arranged adjacent to and/or in an area of a mounting surface of the assembly.

It is possible to connect the fastener to the installation assembly in a detachable manner with the aid of a fork-shaped receptacle. For example, the fastener can be inserted laterally into the receptacle. With a correspondingly configured fastener arranged thereon, torque can be transmitted via the receptacle to the fastener. In this way, the entire fastener can be rotated and moved together with the installation assembly, in order to guide the fastener through the component and the workpiece which will be fastened together via the fastener.

It is particularly preferable if the fork-shaped receptacle is spaced apart from the mounting surface. This makes it possible for the receptacle to, e.g., engage with projection(s) of fastener, such that the fastener is axially secured to the installation assembly. An axial direction corresponds to a direction that is parallel to a rotational axis of the drive mandrel. The fastener can thus be securely fastened to the installation assembly so that an accidental or undesired release or separation of the fastener from the installation assembly is prevented while the fastener is being inserted through the component to be fastened and through the workpiece.

Preferably, the fork-shaped receptacle is displaceable or movable along a direction of the rotational axis, i.e., a direction that runs parallel to the rotational axis. The receptacle can thus be somewhat removed from the mounting surface during the insertion of the fastener into the installation assembly. This also allows the drive mandrel to be brought into engagement with the fastener. The drive mandrel itself therefore does not need to be axially moveable.

The fork-shaped receptacle preferably has the form of two receiver elements. A fork-shaped receptacle can more be easily produced from two individual receiver elements. A subsequent adjustment to the fastener is also more easily possible with such an arrangement, since the space between the two receiver elements is not initially fixed.

It is particularly preferable if at least one receiver element is moveable and/or movably mounted. The detachment of the installation assembly from the fastener after the fastener is arranged thereon is also facilitated by utilizing one or more moveable receiver elements.

The spacing between the receiver elements is also preferably made adjustable. Thus, for example, the assembly can be adjusted or changed so that it can function with different fasteners and/or fasteners having different sizes or configurations. If the fastener is axially held by the receiver elements, for example, with the receiver elements engaging projections of the fastener, a detachment of the installation assembly from the fastener can be facilitated by enlarging the spacing between the receiver elements. A quick and simple detachment of the installation assembly from the fastener can thus be provided.

Preferably, the installation assembly utilizes a bearing block that is displaceable and/or movable along a direction the rotational axis. The bearing block can also support the receiver elements so that the receiver elements are able to freely move or pivot. Through an axial displacement or movement of the bearing block in a direction parallel to the rotational axis, the position of the receiver elements can be changed with respect to the drive mandrel. Moreover, the position of the receiver elements can, at first, remain unchanged with respect to one another, even though both receiver elements are supported in the bearing block in a freely movable manner. A change in the spacing between the receiver elements (i.e., with respect to one another) is also possible because the receiver elements are each movably mounted.

It is particularly preferable if the mounting surface is arranged on the bearing block. The axial spacing between the receiver elements and the mounting surface can then always remain constant, even in the event of a displacement or axial movement of the receiver elements. This spacing can, in particular, be matched precisely to projections of the fastener, so that the fastener is connected to the installation assembly substantially free from play in the axial direction.

Preferably, the installation assembly has a support element that is arranged in a housing in a stationary manner. The receiver elements can be guided and/or arranged in grooves of the support element. The receiver elements can be supported in two ways: on the one hand, the receiver elements are free to pivot relative to the displaceable bearing block; on the other hand, they are mounted in grooves of the support element. A precisely defined or limited movement of the receiver elements can therefore occur when the bearing block moves. For example, the spacing of the receiver elements with respect to one another can be made dependent on their axial position.

It is particularly preferred that the grooves to run, at least in part, substantially parallel to the rotational axis, and, at least in part, substantially at an angle to the rotational axis. When the bearing block is axial displaced or moved, the spacing of the receiver elements can remains constant over a first area in which the grooves are arranged substantially parallel. However, in a second area, where the grooves run at an angle to the rotational axis, the spacing of the receiver elements changes. It is thereby possible to keep the spacing of the receiver elements constant with respect to one another during the insertion of the fastener, although an axial position change takes place in order to be able to bring the fastener into engagement with the drive mandrel. To detach the installation assembly from the fastener, the installation assembly need only to be moved in the axial direction away from the fastener. When this occurs, the receiver elements transition from the parallel area of the grooves to the area running at an angle to the rotational axis, whereby the spacing of the receiver elements with respect to one another is increased—resulting in the fastener being released. This arrangement thus makes it possible to securely hold of the fastener during its installation or placement operation, and, at the same time, allows the fastener to be quickly and simply detached or released from installation assembly after completion of the placement operation.

Preferably, the installation assembly has a first spring that participates in holding the bearing block on the support element. A resting position of the bearing block in the support element can be defined thereby. At the same time, however, an axial displacement of the bearing block away from the support element is allowed and not prevented.

Preferably, the installation assembly also utilizes a second spring, which exerts a force on the bearing block only after a defined displacement of the bearing block along a direction of the rotational axis. This force can correspond to the force generated by the first spring. It is thus possible to move the bearing block with the aid of a relatively low force (resisted by the first spring) in a direction parallel to the rotational axis as a first step. A further displacement of the bearing block, which would lead to an increase in the spacing between the receiver elements, then occurs only through the application of a greater force (of which the second spring participates in resisting). Both springs can thereby have the same spring temper. However, it is also possible for the second spring to have a higher spring temper and/or require more or a greater force to compress the spring.

Preferably, the drive mandrel (and/or a portion thereof) projects beyond the mounting surface. A radial securing or fixing of the fastener on the installation assembly can thereby be carried out with the aid of the drive mandrel. Since the mounting surface is arranged on the displaceable bearing block, the mounting surface can be displaced with respect to the drive mandrel during the insertion or installation of the fastener on the installation assembly such that the fastener can be guided via the drive mandrel.

Preferably, the installation assembly has a guide element that is arranged on a side of the mounting surface between the receiver elements. The guide element can be attached to the housing and can project in the axial direction out beyond the mounting surface and the drive mandrel. The guide element can have a taper on a side facing away from the mounting surface. During insertion of the fastener into the installation assembly, the fastener can be pushed over the tapered side of the guide element between the receiver elements. This causes an axial displacement of the receiver elements, i.e., due to the axial extension of the guide element. The fastener can thereby slide over the drive mandrel, with an axial backward movement of the receiver elements subsequently occurring. In this way, the fastener is radially secured by the drive mandrel and also by the guide element.

Preferably, the side of the mounting surface lying opposite the guide element is limited by a stop. A movement of the fastener in each direction can thus be prevented. In the radial direction, a movement of the fastener is prevented by the stop, the guide element, and the two receiver elements. Once engaged with the fastener, such movement is also limited by the drive mandrel. In the axial direction, a movement of the fastener is opposed or prevented by the mounting surface and the receiver elements. The fastener is thus held securely, undetachably and reliably in the installation assembly. However, it can also be easily released after the conclusion of the placement operation.

Preferably, the housing has a receiving geometry or mounting end which allows the installation assembly to be connected or mounted to a screwdriver or tool. For example, the tool can be conventional screwdriver, that is, an electric or pneumatic tool (or one operated in any other manner). The tool is used to drive the drive mandrel and can be either removably or non-removably mounted and/or connected to the installation assembly via the receiving geometry. The installation assembly is also preferably configured to be utilized on existing tools.

Preferably, the housing has a generally cylindrically configuration. A cylindrical shape can be more easily produced.

The invention also provides for a placing device for placing a fastener, comprising a housing, a mounting surface for a fastener and comprising an opening, a drive mandrel comprising a rotation axis and a portion which passes through the opening and that is structured and arranged to engage the fastener, and a fork-shaped receptacle arranged at least one of in an area of the mounting surface, adjacent the mounting surface, and associated with the mounting surface.

The fork-shaped receptacle may be spaced apart from the mounting surface. The fork-shaped receptacle may be movable along a direction that is substantially parallel to the rotational axis. The fork-shaped receptacle may comprise two receiver elements. At least one of the two receiver elements may be one of moveable and movably mounted. A spacing between the two receiver elements may be adjustable. The device may further comprise a bearing block that is movable along the rotational axis. The fork-shaped receptacle may comprise plural receiver elements mounted to the bearing block. The mounting surface may be arranged on the bearing block.

The device may further comprise a support element that is arranged in the housing in a stationary manner and wherein the fork-shaped receptacle comprises plural receiver elements which are movably guided by grooves of the support element. Each groove may have a portion arranged generally parallel to the rotational axis and a portion arranged at an angle to the rotational axis.

The device may further comprise a first spring that at least one of biases a bearing block towards an initial position and biases a bearing block towards a support element. The device may further comprise at least one of a second spring that opposes movement of the bearing block only after a defined displacement of the bearing block, a second spring that is substantially similar to the first spring, and a second spring that resists a substantially similar force to that of the first spring.

The drive mandrel may have a portion that projects out beyond the mounting surface. The device may further comprise at least one of a guide element arranged on a side of the mounting surface between the fork-shaped receptacle, the guide element being attached to the housing and projecting out more than the mounting surface and the drive mandrel and a guide element comprising a taper on its side facing away from the mounting surface. The device may further comprise a stop arranged on a side of the mounting surface lying opposite the guide element.

The housing may comprise at least one of a receiving geometry adapted to be coupled to a tool, a receiving geometry adapted to be coupled to a screwdriver, and a connecting portion adapted to be coupled to a tool. The housing may be generally cylindrical.

The invention also provides for a method installing a fastener on the device of the type described above, wherein the method comprising sliding the fastener between lateral extensions of the fork-shaped receptacle. The fastener may be installable laterally and in a direction that is generally perpendicular to the rotation axis of the drive mandrel.

The invention also provides for a fastener installation device comprising a housing, a mounting surface adapted to contact a head of a fastener and comprising an opening, a rotatable drive mandrel comprising a portion which passes through the opening and that is structured and arranged to engage with the head of the fastener, and pivotally mounted receiver elements each having a lateral extension, wherein the fastener is installable onto the fastener installation device laterally via the lateral extensions.

The fastener may be installable onto the fastener installation device laterally and in a direction that is generally perpendicular to a rotation axis of the device mandrel.

The invention also provides for a fastener installation device comprising a housing, a mounting surface adapted to contact a head of a fastener and comprising an opening, a rotatable drive mandrel comprising a portion which passes through the opening and that is structured and arranged to engage with the head of the fastener, pivotally mounted receiver elements each mounted to an axially mobale bearing block and having a lateral extension, and a support element comprising guide grooves that control the pivoting movement of the receiver elements when the bearing block moves axially, wherein the fastener is installable onto the fastener installation device laterally via the lateral extensions.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
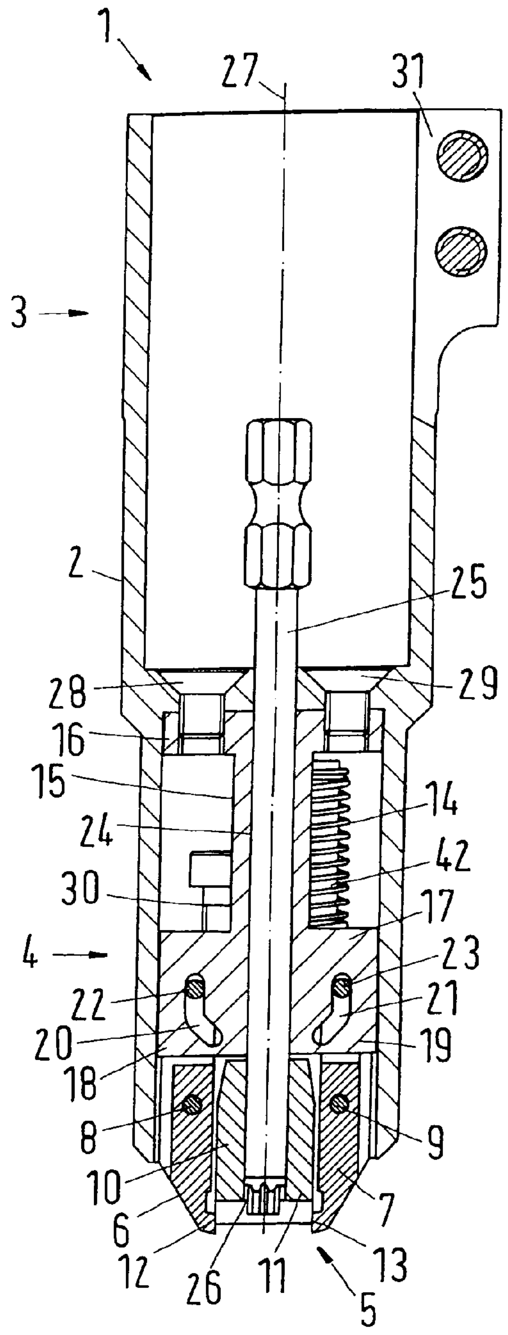
FIG. 1 shows a sectional view of a installation assembly or placing device according to the invention.

FIG. 1 shows a fastener installation assembly or placing device 1 in sectional view. The placing device has a housing 2, which is preferably has a generally cylindrical shape in the present exemplary embodiment. Of course, other shapes and/or configurations are possible. The housing 2 has two sections 3 and 4. Section 3 is used to receive or mount to a tool such as, e.g., a screwdriver (not shown). A fork-shaped receiver arrangement 5 is located on a front face area of the housing 2 facing away from section 3. The receiver arrangement 5 preferably utilizes two receiver elements 6 and 7. The receiver elements 6 and 7 are held and/or mounted to a bearing block 10 in a freely pivotable manner by way of studs 8 and 9. The bearing block 10 has a mounting surface 11 which can be configured for a fastener (see e.g., FIGS. 8 and 9). The receiver element 6 has hooked projection 12 and the receiver element 7 has hooked projection 13. These projections 12 and 13 are used to fasten the fastener. The bearing block 10 is held on and/or mounted to a support element 15 with the aid of a first spring 14. The support element 15 has first and second flanges 16 and 17. The first flange 16 is used to fasten and/or secure the support element 15 in the housing 2. Two webs 18, 19 are arranged on the second flange 17 (see also FIG. 7) of the support element 15 on the side facing away from the first flange 16. The webs 18 and 19 have grooves 20, 21. The grooves 20, 21 have the form of elongated through openings or slots. The receiver elements 6 and 7 are supported in the grooves 20, 21 via studs 22, 23.

The support element 15 also a centrally arranged opening 24, through which a drive mandrel 25 is guided. The drive mandrel 25 has an end portion that extends through an opening 26 arranged in the bearing block 10 or the mounting surface 11.

The drive mandrel 25 has a screw head arranged on a front area of the mounting surface 11. By way of non-limiting example, this screw head has a Torx profile. Other engagement profiles are also possible, for example, a Phillips slot, a hexagon socket, etc. Arranged on the opposite end of the drive mandrel 25 is a polygonal cross section which can be connected to a drive of a tool in order to render possible a torque-transmitting connection to the tool. The rotational axis 27 of the drive mandrel 25 is illustrated by a broken line in FIGS. 1 and 2.

Two screws 28, 29 are utilized to attach the support element 15 in the housing 2. An axial shifting movement of the bearing block 10 relative to the housing 2 is limited with the aid of screw 30.

Figure 2:
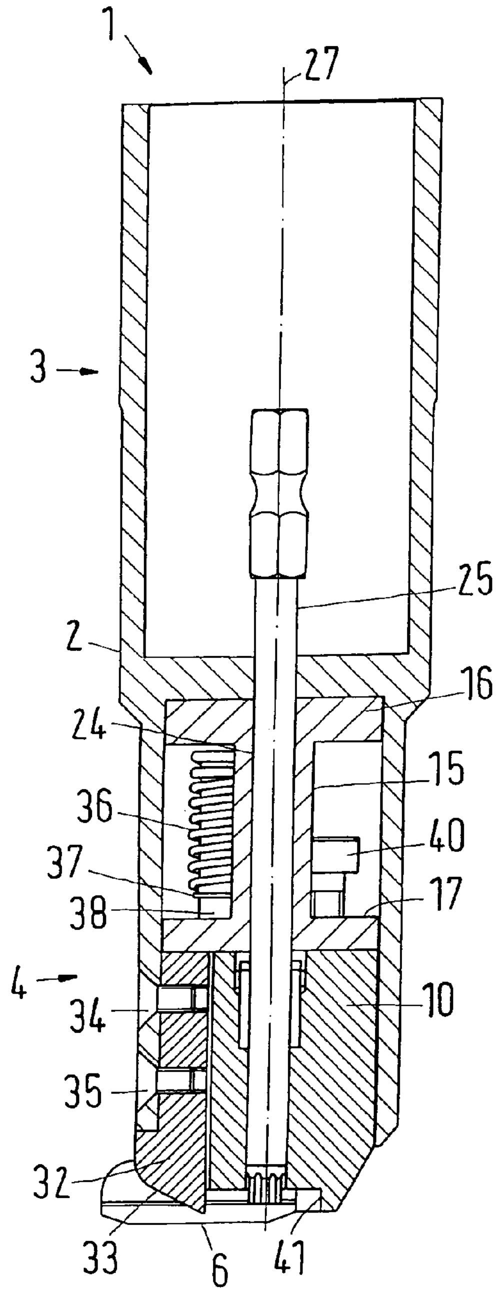
FIG. 2 shows another sectional view of the installation assembly.

The housing 2 is shown in FIGS. 1 and 2 has a one-piece configuration. However, it is also conceivable to manufacture sections 3 and 4 separately and they connect these connections together to form the housing 2. The placing device 1 can preferably be adjusted in order to accommodate different tools, e.g., screwdrivers. This can be carried out by, e.g., a replacement of the section 3, which has the receiving geometry 31 for the screwdriver. No modification of the section 4 would thereby be necessary.

FIG. 2 shows the same placing device 1 as in FIG. 1 with the sectional plane being rotated by 90° around the rotational axis. As can be seen in FIG. 2, a guide element 32 is fastened in the housing 2 such that it has a front portion that projects beyond the mounting surface 11. The guide element 32 includes a taper 33 arranged on a side which receives the fastener. The guide element 32 projects further over the mounting surface 11 than the drive mandrel 25. Two screws 34, 35 are utilized to fasten the guide element 32 in the housing 2.

The placing device 1 also utilizes a second spring 36. The spring 36 is arranged on a stud 38 and has one end that engages with a washer 37. The stud 38 is connected to the bearing block 10 and extends through a opening in the support element 15. The washer 37 is connected to and/or axially fixed the stud 38 such that at first a displacement of the bearing block 10 in the axial direction is possible, without the second spring 36 being compressed. After the washer 37 contacts the flange 17, the second spring 36 can be gin to be compressed. A screw 40 serves as a stop and limits the maximum amount of axial movement of the bearing block 10 with respect to the support element 15 (i.e., by contacting flange 17), when the second spring 36 is compressed.

The bearing block 10 has a stop surface 41, which is arranged opposite the guide element 32 and on one side of the mounting surface 11.

A fastener (e.g., of the type shown in FIGS. 8 and 9) can be inserted into the fork-shaped receptacle 5 laterally, i.e., from the left side with respect to FIG. 2, by placing the head of the fastener between and at the left-side open end of the receiving elements 6 and 7. A displacement of the receiver elements 6 and 7 and of the bearing block 10 occurs when the fastener reaches the taper 33 of the guide element 32. The fastener is guided over the drive mandrel 25 with the aid of the guide element 32. However, the bearing block 10 and the receiver elements 6 and 7 are moved back axially in the direction of the support element 15 when the fastener has been guided via the guide element 32. The spacing between the guide element 32 and stop 41 is such that the fastener head is not as wide as the free area between guide element 32 and stop 41.

During this insertion movement, the bearing block 10 is movably guided via the studs 38 and 42 in the support element 15. The stud 42 extends through the first spring 14 and the stud 38 extends through the second spring 36.

Since the guide element 32 extends out further than the mounting surface 11 and than the drive mandrel 25, the position of the final fastener is secured or retained even when the drive mandrel 25 has not yet engaged in the corresponding mating surface of the fastening unit 58, i.e., even when portion 26 has not engaged with portion 66. However, this engagement occurs at the latest when the drive mandrel 25 is rotated.

To release the placing device 1 from the fastener (or vice versa) the placing device 1 must be moved away substantially axially from the fastener. When this occurs, the receiver elements 6 and 7 (and thus the bearing block 10) are moved away axially from the support element 15, wherein, at first, only the biasing force of the first spring 14 is overcome. The studs 22, 23, which guide the receiver elements 6 and 7 in the grooves 20 and 21, are located in the area of the grooves 20, 21, which run parallel to the rotational axis 27, guide this movement.

With a further removal of the placing device 1 from the fastener (or movement away from the fastener), the washer 37 comes into contact with the support element 15, i.e., with the flange 17. Further movement along this direction must now overcome the spring force of the second spring 36. At substantially the same time, the studs 22, 23 reach the area of the grooves 20, 21 which run at an angle to the rotational axis 27. As a result, the receiver elements 6 and 7 pivot about the studs 8, 9, which causes the free ends of the receiver elements 6 and 7 to move apart, whereby the fastener to be released. The bearing block 10 is then moved towards the support element 15 automatically owing to the biasing force of the springs 14 and 36. The placing device 1 then assumes the position shown in FIGS. 1 and 2.

Figure 3:
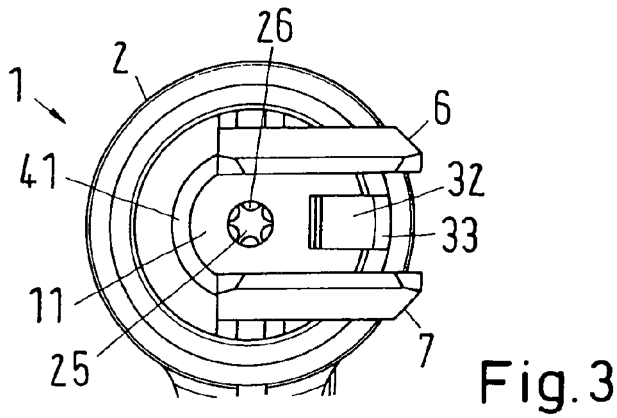
FIG. 3 shows a diagrammatic representation of a front face of the installation assembly.

FIG. 3 shows the front face of the placing device 1, on which the fastener is retained for installation.

Figure 4:
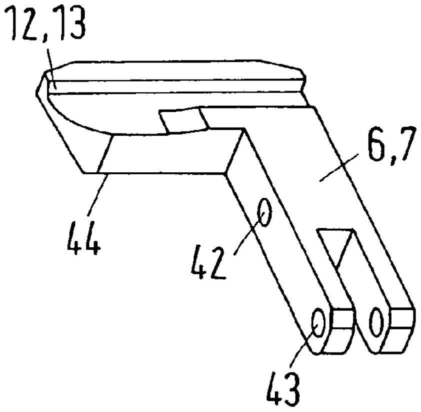
FIG. 4 shows a diagrammatic representation of one of the receiver elements utilized on the installation assembly.

FIG. 4 shows one of receiver elements 6, 7. Each receiver element 6, 7 has two bores or openings 42, 43. The bore 42 is used to receive one of the studs 8, 9 and the bore 43 is used to receive one of the studs 22, 23. Each receiver element 6, 7 also utilizes a projection 12, 13 that runs substantially parallel to the bores 42, 43. Each receiver element 6, 7 also has an extension 44 projecting a right angle to the section having the bores 42, 43. The extension 44 preferably has a sufficiently long guide surface to assist in inserting the fastener.

Figure 5:
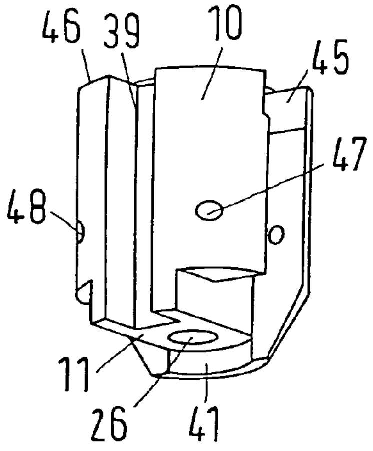
FIG. 5 shows a diagrammatic representation of a bearing block utilized on the installation assembly.
Figure 6:
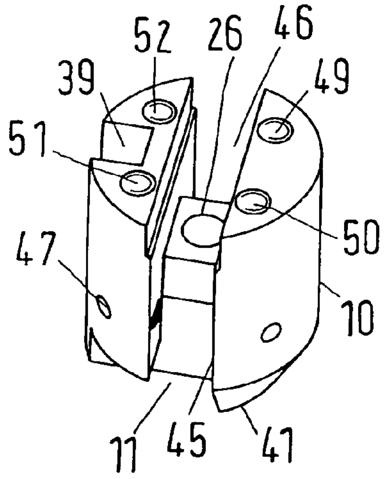
FIG. 6 shows another diagrammatic representation of the bearing block shown in FIG. 5.

FIGS. 5 and 6 show the details of the bearing block 10 used in FIGS. 1 and 2. The bearing block 10 has two oppositely arranged grooves 45, 46 which are configured to at least partially receive receiver elements 6 and 7. The block 10 also has two bores 47, 48, which are used to pivotally mount the receiver elements 6 and 7 with the aid of the studs 8 and 9.

Furthermore, the bearing block 10 also has a groove 39 which provides a space necessary for receiving the guide element 32 which is fixed to the housing 2 via screws 34, 35. Four threaded holes 49 through 52 are arranged on an end of the bearing block 10 opposite the mounting surface 11. These threaded holes receive the threaded portions of the screws 30 and 40 and the studs 38 and 42.

Figure 7:
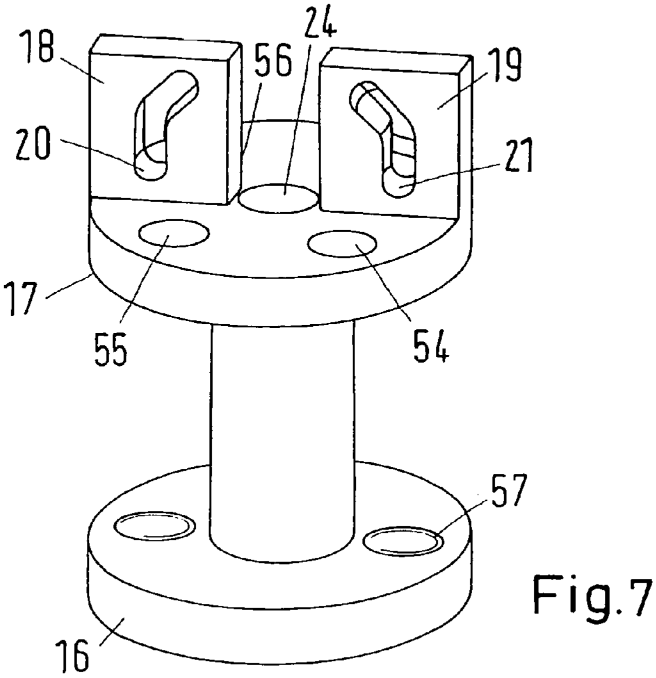
FIG. 7 shows a diagrammatic representation of the support element utilized on the installation assembly.

FIG. 7 shows the details of the support element 15 used in FIGS. 1 and 2. The support element 15 has two bores 57 in the first flange 16. These bores 57 are used to fasten and/or fixedly secure the support element 15 in the housing 2. The second flange 17 of the support element 15 has four bores 53 through 57. The studs 38, 42 and the screws 30 and 40 are guided through these bores 53 through 57. Two webs 18 and 19 are arranged on the side of the flange 17 facing away from the first flange 16. The webs 18 and 19 have guide grooves 20 and 21 whose purpose was described above. A centrally arranged bore 24 is provided to guide the drive mandrel 25.

The grooves 20, 21 have first sections that each run parallel to the rotational axis 27 of the drive mandrel 25 and second sections which run or angle towards one another.

The support element 15 makes it possible the accommodate the first spring 14, the second spring 36, as well as the corresponding studs 22, 23 and the screws 30 and 40. The screws 30 and 40 serve as a stop thereby limiting axial movement of the block 10. Overall, this produces a compact design.

Figure 8:
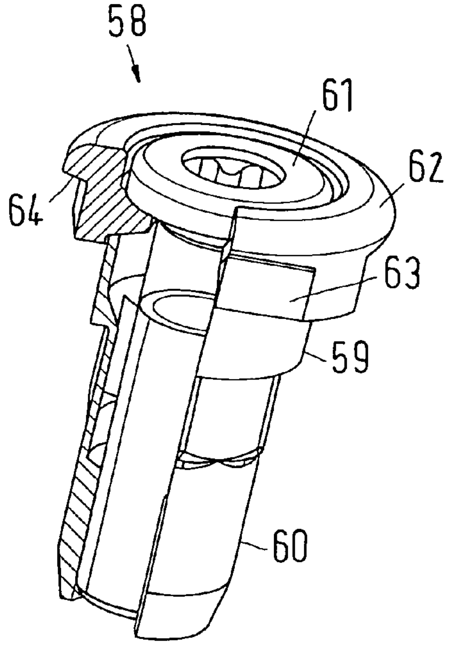
FIG. 8 shows a diagrammatic representation of a fastening unit which can be used with the installation assembly of the invention.
Figure 9:
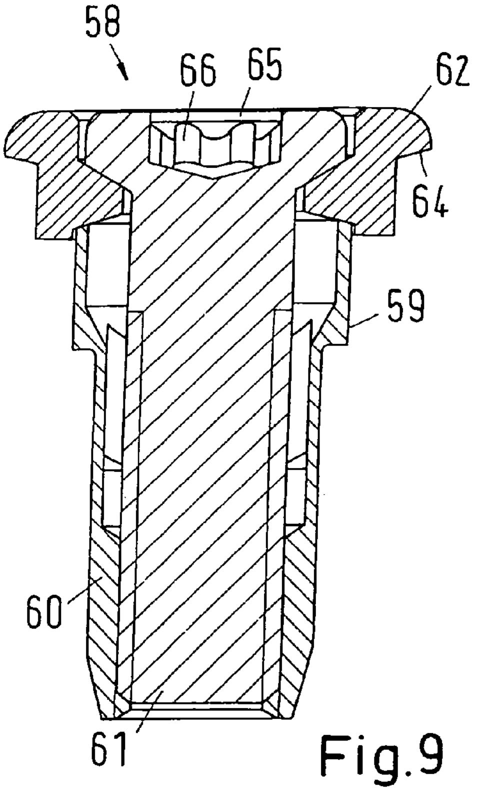
FIG. 9 shows a sectional view of the fastening unit shown in FIG. 8.

FIGS. 8 and 9 show a non-limiting fastener 58, which can be placed or installed in a workpiece with the aid of the placing device 1. The fastener 58 has a blind rivet nut 59, a rivet shank 60, and a screw 61 that is screwed into the blind rivet nut 59. The screw 61 has a divided screw head. The fastener also includes washer section 62. The washer 62 has torque application surfaces embodied as, e.g., a square-shaped surfaces 63. Projections 64 project over the surfaces of the surfaces 63.

The manner by which the fastener can be installed on the device 1 will now be described. In order to place or install the fastener 58 on the device 1, it is pushed into the fork-shaped receptacle 5 of the placing device 1 by guiding it laterally into the receiver elements 6 and 7. At the same time, the projections 12, 13 of the receiver elements 6, 7 engage with the projections 64 of the fastener 58, i.e., the projections 64 are received in recesses formed in the elements 6 and 7 under projections 12, 13. If the fastener 58 is now pressed or forced laterally against the taper 33 of the guide element 32, an axial displacement of the bearing block and the receiver elements 6 and 7 occurs with respect to the guide element 32, the support element 15, and to the drive mandrel 25. When the fastener 58 strikes or contacts the stop 41, it has already been moved past the guide element 32. An axial movement of the receiver elements 6 and 7 together with the bearing block 10 in the direction of the support element 15 has thus already occurred at this point, so that the fastener 58 can no longer be moved back to the initial lateral position. At this point, the engaging portion of the drive mandrel 25 is accommodated in a cylindrical recess 65 of the fastener 58 and possibly engages with the screw head profile 66. The alignment of the mandrel 25 and the cylindrical recess 65 can occur even when the corresponding torque application surfaces of the drive mandrel 25 and of the screw head profile 66 have not yet been brought into agreement. However, the engagement between section and of the screw head profile 66 will regardless automatically occur with the rotation of the drive mandrel 25.

The drive mandrel 25 preferrably does not exhibit any axial play inside the placing device 1. Forces that are applied to the drive mandrel 25 through the tool, e.g., a screwdriver, in the axial direction are thus directly transferred to a fastener 58. A loading of the placing device 1 thus does not take place via the tool.

The release of the fastener 58 from the placing device 1 takes place as described above through a simple substantially axial movement of the placing device 1 away from the fastener 58.

The placing device 1 thus renders possible a quick and simple insertion of the fastener into a receptacle, with the fastener 58 being reliably held in the receptacle of the placing device. An accidental or inadvertent release of the fastener 58 during the insertion of the fastener 58 into a component to be fastened (and a workpiece) is thus rendered virtually impossible. During the actual placement operation, the washer 62 of the fastening unit 58 can be held in the placing device 1 in a torsionally resistant manner, i.e., held in a manner which prevents its rotation. With a corresponding torque-transmitting connection between the washer 62 and the blind rivet nut 59, a placement of the fastener into round openings in the workpiece is thus also possible. The release of the placing device 1 from the fastener 58 then occurs through a simple axial pulling.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A placing device for placing a fastener, comprising:
- a housing;
- a mounting surface for a fastener and comprising an opening;
- a drive mandrel comprising a rotation axis and a portion which passes through the opening and that is structured and arranged to engage the fastener; and
- a fork-shaped receptacle arranged at least one of in an area of the mounting surface, adjacent the mounting surface, and associated with the mounting surface, the fork-shaped receptacle comprising at least two receiver elements rotatably supported on a bearing block.

2. The device of claim 1, wherein the fork-shaped receptacle is spaced apart from the mounting surface.

3. The device of claim 1, wherein the fork-shaped receptacle is movable along a direction that is substantially parallel to the rotational axis.

4. The device of claim 1, wherein a spacing between the two receiver elements is adjustable.

5. The device claim 1, wherein the bearing block that is movable along the rotational axis.

6. The device of claim 5, wherein the mounting surface is arranged on the bearing block.

7. The device of claim 1, further comprising a support element that is arranged in the housing in a stationary manner and wherein the plural receiver elements are movably guided by grooves of the support element.

8. The device of claim 7, wherein each groove has a portion arranged generally parallel to the rotational axis and a portion arranged at an angle to the rotational axis.

9. The device of claim 1, further comprising a first spring that at least one of:
- biases the bearing block towards an initial position; and
- biases the bearing block towards a support element.

10. The device of claim 9, further comprising a second spring that at least one of:
- opposes movement of the bearing block only after a defined displacement of the bearing block;
- is substantially similar to the first spring; and
- resists a substantially similar force to that of the first spring.

11. The device of claim 1, wherein the drive mandrel has a portion that projects out beyond the mounting surface.

12. The device of claim 1, further comprising a guide element that at least one of:

is arranged on a side of the mounting surface between the fork-shaped receptacle, the guide element being attached to the housing and projecting out more than the mounting surface and the drive mandrel; and comprises a taper on its side facing away from the mounting surface.

13. The device of claim 12, further comprising a stop arranged on a side of the mounting surface lying opposite the guide element.

14. The device of claim 1, wherein the housing comprises at least one of:

a receiving geometry adapted to be coupled to a tool;

a receiving geometry adapted to be coupled to a screwdriver; and a connecting portion adapted to be coupled to a tool.

15. The device of claim 1, wherein the housing is generally cylindrical.

16. A method installing a fastener on the device of claim 1, wherein the method comprising:

sliding the fastener between lateral extensions of the fork-shaped receptacle.

17. The method of claim 16, wherein the fastener is installable laterally and in a direction that is generally perpendicular to the rotation axis of the drive mandrel.

* * * * *